United States Patent
Park et al.

(10) Patent No.: US 11,781,371 B2
(45) Date of Patent: Oct. 10, 2023

(54) FLEXIBLE COVER WINDOW

(71) Applicant: UTI INC., Chungcheongnam-do (KR)

(72) Inventors: Deok Young Park, Gyeonggi-do (KR); Jae Young Hwang, Gyeonggi-do (KR); Hak Chul Kim, Chungcheongnam-do (KR); Kukhyun Sunwoo, Gyeonggi-do (KR); Tea Joo Ha, Chungcheongnam-do (KR)

(73) Assignee: UTI INC.

( * ) Notice: Subject to any disclaimer, the term of this patent is extended or adjusted under 35 U.S.C. 154(b) by 572 days.

(21) Appl. No.: 16/915,392

(22) Filed: Jun. 29, 2020

(65) Prior Publication Data
US 2021/0002947 A1    Jan. 7, 2021

(30) Foreign Application Priority Data
Jul. 3, 2019    (KR) ......................... 10-2019-0079891

(51) Int. Cl.
| | |
|---|---|
| *B32B 27/08* | (2006.01) |
| *G06F 1/16* | (2006.01) |
| *E06B 3/28* | (2006.01) |

(52) U.S. Cl.
CPC ............... *E06B 3/28* (2013.01); *B32B 27/08* (2013.01); *B32B 2255/205* (2013.01); *B32B 2307/416* (2013.01)

(58) Field of Classification Search
CPC .............. B32B 27/08; B32B 2255/205; B32B 2307/416; B32B 17/10; B32B 2307/412; B32B 2457/20; E06B 3/28; G06F 1/1641; G06F 1/1652; G06F 2200/1634; G09F 9/301; Y10T 156/109; G02B 5/045; B62D 3/00

See application file for complete search history.

(56) References Cited

U.S. PATENT DOCUMENTS 3,981,709 A * 9/1976 Kondo ..................... G02C 7/02
451/240
10,375,839 B2    8/2019 Jung et al.
(Continued)

FOREIGN PATENT DOCUMENTS

JP    2018-197183 A    12/2018
KR    10-2012-0119020 A    10/2012
(Continued)

*Primary Examiner* — Maria V Ewald
*Assistant Examiner* — Daniel P Dillon
(74) *Attorney, Agent, or Firm* — Mendelsohn Dunleavy, P.C.

(57) ABSTRACT

Proposed is a flexible cover window for a flexible display, the flexible cover window including: a first window made of glass and provided on an upper part of a first surface of the flexible display; a second window made of glass and provided on an upper part of a second surface of the flexible display; and a folding part provided between the first window and the second window by corresponding to a folding area of the display and filled with a transparent resin material, wherein a transparent resin layer is provided on a total surface of each of the first window and the second window by continuing to the folding part filled with the transparent resin material, and a chamfer part is provided on each of an end part of the first window and an end part of the second window, which are adjacent to the folding part.

18 Claims, 8 Drawing Sheets

(56) References Cited

U.S. PATENT DOCUMENTS

| | | | |
|---|---|---|---|
| 10,522,060 B2 | 12/2019 | Park et al. | |
| 2010/0285275 A1* | 11/2010 | Baca | C03C 15/00 65/60.5 |
| 2012/0057100 A1* | 3/2012 | Masuda | G02B 5/045 359/619 |
| 2015/0004334 A1* | 1/2015 | Bae | B32B 38/0008 156/298 |
| 2015/0110990 A1* | 4/2015 | Chou | B05D 3/067 427/508 |
| 2018/0074397 A1* | 3/2018 | Koike | C03C 21/002 |
| 2018/0096635 A1* | 4/2018 | Park | H05K 1/028 |
| 2018/0339939 A1 | 11/2018 | Hashimoto et al. | |

FOREIGN PATENT DOCUMENTS

| | | |
|---|---|---|
| KR | 10-2016-0083789 A | 7/2016 |
| KR | 10-2017-0026747 A | 3/2017 |
| KR | 10-2018-0036304 A | 4/2018 |

\* cited by examiner

FLEXIBLE COVER WINDOW

CROSS REFERENCE TO RELATED APPLICATION

The present application claims priority to Korean Patent Application No. 10-2019-0079891, filed Jul. 3, 2019, the entire contents of which is incorporated herein for all purposes by this reference.

BACKGROUND OF THE INVENTION

Field of the Invention

The present invention generally relates to a flexible cover window. More particularly, the present invention relates to a flexible cover window, in which visibility of a boundary part of a folding part, that is, visibility of a boundary part to the naked eye due to the reflection of a boundary surface of glass is minimized, and strength and folding properties are secured.

Description of the Related Art

Recently, electric and electronic technologies have been rapidly developed, and various types of display products are released to meet demands of a new era and various consumer demands. Among them, research on a flexible display in which the screen can be folded and unfolded is active.

The research on the flexible display is being conducted by bending, rolling, and stretching the display, fundamentally starting from folding the display. In addition to a display panel, a cover window protecting the display panel is also required to be formed flexibly.

Such a flexible cover window is required to fundamentally have excellent flexibility, and to have no marks on a folding part and no distortion of image quality even after being repeatedly folded.

The cover window of a conventional flexible display has used a polymer film such as a PI or PET film on a display panel surface.

However, since such a polymer film is weak in mechanical strength, the polymer film serves only to prevent scratches of the display panel and is vulnerable to external impacts. Furthermore, the polymer film has a low transmittance and is known to be relatively expensive.

In addition, in the case of the polymer film, as the number of times the display is folded increases, marks remain on the folding part, which inevitably damages the folding part. For example, the polymer film is pressed or torn during folding limit evaluation (usually 200,000 times).

Recently, a research on a glass-based cover window has been conducted to overcome the limitation of the cover window provided with the polymer film.

As a prior art for such a glass-based cover window, there is "Foldable display device" (Korean Patent Application Publication No. 10-2017-0122554), which provides a cover window formed to be thin in a folding part.

The cover window according to the prior art is formed to become thicker as distance from a folding line defined as having the minimum thickness increases. That is, the folding part of the cover window according to the prior art in which a minimum thickness area is defined as a line shows a curved shape.

According to the prior art, the thickness of the cover window is rather thick, and thus a curvature radius of the folding part is determined to be much larger than 2.0 mm suitable for commercialization. In this case, it is difficult to implement free folding and the durability of the folding part, that is, folding properties are decreased.

As for the prior art, the minimum thickness area of the folding part appears as a relatively small line (the folding line). In this case, when folding is repeated, thick parts break during the folding.

As for the folding part having a curved shape, it is not easy to align its center during mechanical assembly, so assembly tolerances may occur, which may result in deterioration of product quality and quality difference between products.

As for the prior art, the folding part having the thin portion formed in the cover window is bonded to the display panel, which is a flat plate. In this case, space (an air layer) is formed between the folding part and the surface of the display panel, which causes the problem of distortion of image quality due to difference in a refractive index between glass and the air layer. Furthermore, the folding part is damaged due to the pressure of a touch pen or is lowered in durability since a bonding force between portions adjacent to the folding part and the display panel is decreased.

Accordingly, the glass-based cover window is required to satisfy the folding properties and fundamentally required properties such as no distortion of image quality and sufficient strength to withstand the repeated touching and certain pressure of a touch pen. To satisfy the strength property of the cover window, the glass is required to have at least a predetermined thickness, and to satisfy the folding properties, the glass is required to have a predetermined thickness or less. Accordingly, research on the thickness and structure of an optimum cover window, which satisfies the folding properties while satisfying the strength property and has no distortion of image quality, is needed.

Furthermore, when glass has a predetermined thickness or less, intrinsic texture of tempered glass decreases, so this is also required to be taken into account.

Accordingly, a technique for providing the cover window is needed, in which appropriate thickness is maintained to secure strength while maintaining the intrinsic texture of tempered glass and the folding properties are also satisfied.

Due to such a need, the present applicant has filed a "Flexible cover window" (Korean Patent Application No. 10-2019-0027399).

The prior art provides a glass-based cover window for a flexible display, and includes a folding part slimmed by corresponding to a folding area of the display. Here, as illustrated in FIG. 1, a boundary part is formed on opposite ends of the folding part, the boundary part having a thickness gradually becoming larger from the folding part and continuing to a plane area of the cover window. The boundary part is visible to the naked eye due to the reflection of light. Accordingly, visibility of the cover window may decrease.

FIG. 2 illustrates a case in which a reflective surface of the boundary part between the folding part and the plane area is visible to the naked eye, which causes distortion of a screen and reduces resolution of a screen. This problem is required to be improved when the flexible cover window is applied.

SUMMARY OF THE INVENTION

Accordingly, the present invention has been made keeping in mind the above problems occurring in the related art, and the present invention is intended to propose a flexible cover window in which visibility is improved, and strength and folding properties are secured while the intrinsic texture of glass is maintained.

In order to achieve the above objectives, according to one aspect of the present invention, there is provided a flexible cover window for a flexible display, the flexible cover window including: a first window made of glass and provided on an upper part of a first surface of the flexible display; a second window made of glass and provided on an upper part of a second surface of the flexible display; and a folding part provided between the first window and the second window by corresponding to a folding area of the display and filled with a transparent resin material, wherein a transparent resin layer is provided on a total surface of each of the first window and the second window by continuing to the folding part filled with the transparent resin material, and a chamfer part is provided on each of an end part of the first window and an end part of the second window, which are adjacent to the folding part, a curvature radius of the chamfer part being 0.01 to 0.1 mm.

In addition, a low-reflection inorganic material may be added to the transparent resin material or the transparent resin layer. 10 to 80 parts by weight of the low-reflection inorganic material may be included in a resin material with respect to 100 parts by weight of the resin material constituting the transparent resin material and the transparent resin layer. The resin material may be an optical clear resin (OCR).

Furthermore, the low-reflection inorganic material may be one of glass frit, glass fiber, titanium oxide nanoparticles, and silica nanoparticles, or a mixture thereof, and a particle size of the low-reflection inorganic material may be 5 nm to 100 nm.

Additionally, a low reflection surface texturing may be performed on a surface of the chamfer part, or on the surface of each of the first window and the second window. In the low reflection surface texturing, titanium oxide or silica may be deposited on the surface of the chamfer part or on the surface of each of the first window and the second window, or the surface of the chamfer part, or the surface of each of the first window and the second window may be chemically etched.

Meanwhile, a micro-lens array pattern may be formed on a surface of the transparent resin layer.

In addition, the chamfer part may be provided on a surface or opposite surfaces of each of the first window and the second window.

Furthermore, inclination of the chamfer part may be 1 to 10° relative to a horizontal direction of the cover window.

Additionally, the transparent resin layer may be provided on the surface of each of the first window and the second window, or on a total surface of opposite surfaces thereof, or on a total surface of front, back, and side surfaces thereof to completely cover the first window and the second window inside the transparent resin layer.

In addition, in the transparent resin layer, the transparent resin layer provided on the back surface of each of the first window and the second window may be made of a material softer than a material of the transparent resin layer provided on the front surface of each of the first window and the second window.

Furthermore, the chamfer part may be provided by any one process of wet etching, polishing, laser forming, and masking processes, or by a process of combining at least two processes thereof, or by the wet etching, the laser forming, or the masking process, which is followed by the polishing process.

Additionally, the flexible cover window may further include: a functional coating layer provided on a surface or opposite surfaces of the cover window. The functional coating layer may be configured as a single layer or multiple layers.

In addition, the functional coating layer provided on a front surface of the cover window may be embodied as a strength reinforcement layer, and the functional coating layer provided on a back surface of the cover window may be embodied as an elastic reinforcement layer.

Furthermore, when the functional coating layer provided on the front surface of the cover window is configured as multiple layers, the functional coating layer may be made of a material becoming harder upward. Additionally, the functional coating layer provided on an uppermost layer may be given an anti-finger (AF) or an anti-reflective (AR) function.

In addition, a thickness of each of the first window and the second window may be 10 to 200 μm, and the cover window may satisfy a minimum curvature radius of at least 0.5 mm during folding.

The present invention generally relates to the flexible cover window. More particularly, the present invention relates to the flexible cover window, in which the visibility of the boundary part of the folding part, that is, the visibility of the boundary part to the naked eye due to the reflection of the boundary surface of glass is minimized, and strength and folding properties are secured.

In addition, the flexible cover window according to the present invention is made of a composite material of glass and a resin material, so that flexibility, resilience, elasticity, and strength properties are reinforced due to the resin material while the optical properties and texture of glass are maximally maintained.

Additionally, a low reflection surface material is added to or the low reflection surface texturing is performed on the folding area or entire area of the flexible cover window, thereby minimizing the visibility of the boundary part to the naked eye due to the reflection of the boundary surface of glass, minimizing micro-cracks, and improving the bonding strength. In addition, the low-reflection inorganic material is excellent in surface hardness, scratch resistance, and a fingerprint resistance, thereby improving the reliability of display quality.

Furthermore, according to the flexible cover window of the present invention, the limitation of the thickness of the folding part due to the use of the existing glass is minimized due to the use of the composite material of glass and a resin material, so folding and strength properties are improved.

Accordingly, since there is no limitation of the thickness in the folding part, stress difference due to difference of the thickness of glass between a plane area and a folding area can be overcome, so the distortion of a screen or the deterioration of the resolution and durability thereof can be minimized and thus a high quality flexible display can be provided.

That is, the flexible cover window has high transmittance due to optical properties unique to glass, and can resist scratches and absorb external impact due to the securing of mechanical strength, so that a display panel has excellent visibility and impact resistance.

In addition, the folding part of the flexible cover window according to the present invention is filled with the transparent resin material and the transparent resin layer is formed on the total surface of the first window and the second window by continuing to the folding part so as to have no gap between the folding part and the total surface of the display. Accordingly, the distortion of display image quality can be minimized, the decrease of touch response speed and the decrease of bonding strength between the display and the cover window can be overcome, and the assembly tolerances between the cover window and the display panel can be minimized, thereby minimizing quality differences between products.

Additionally, the flexible cover window of the present invention has improved strength and folding properties while being thin and can be used to protect a clear polyimide (CPI) cover by being disposed thereon.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

The present invention generally relates to a flexible cover window. More particularly, the present invention relates to a flexible cover window, in which visibility of a boundary part of a folding part, that is, visibility of a boundary part to the naked eye due to the reflection of a boundary surface of glass is minimized, and strength and folding properties are secured.

In addition, the flexible cover window according to the present invention is made of a composite material of glass and a transparent resin material, so that flexibility, resilience, elasticity, and strength properties are reinforced due to the resin material while the texture of glass is maximally maintained.

Additionally, a low reflection surface material is added to or the low reflection surface texturing is performed on the folding area or entire area of the flexible cover window, thereby minimizing the visibility of the boundary part to the naked eye due to the reflection of the boundary surface of glass, minimizing micro-cracks, and improving the bonding strength. In addition, the low-reflection inorganic material is excellent in surface hardness, scratch resistance, and a fingerprint resistance, thereby improving the reliability of display quality.

Furthermore, according to the flexible cover window of the present invention, the limitation of the thickness of the folding part due to the use of the existing glass is minimized due to the use of the composite material of glass and the resin material, so folding and strength properties are improved.

Accordingly, since there is no limitation of the thickness in the folding part, stress difference due to difference of the thickness of glass between a plane area and the folding area can be overcome, so the distortion of a screen or the deterioration of the resolution and durability thereof can be minimized and thus a high quality flexible display can be provided.

Figure 1:
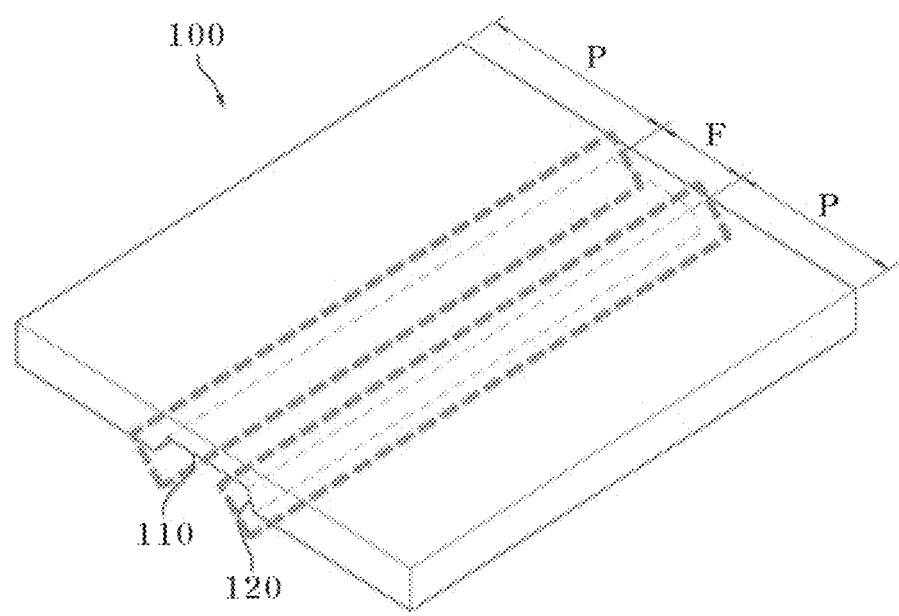
FIG. 1 is a view illustrating an existing flexible cover window.
Figure 2:
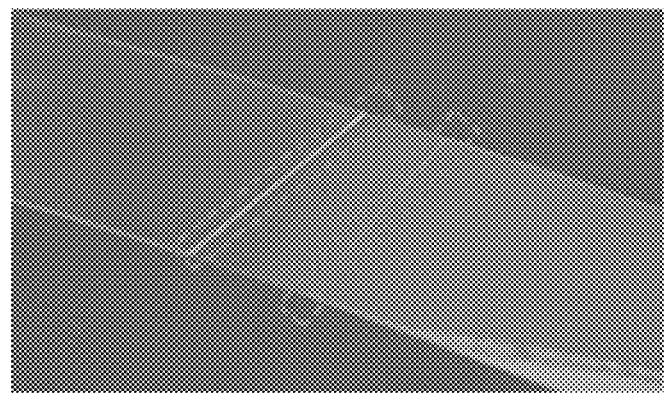
FIG. 2 is a view illustrating the visibility of a boundary part between a folding part and a plane area of the existing flexible cover window.
Figure 3A:
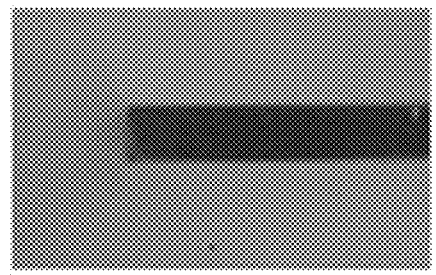
FIG. 3A is a view illustrating the shape of an end part of a window in contact with the folding part in the existing flexible cover window.
Figure 3B:
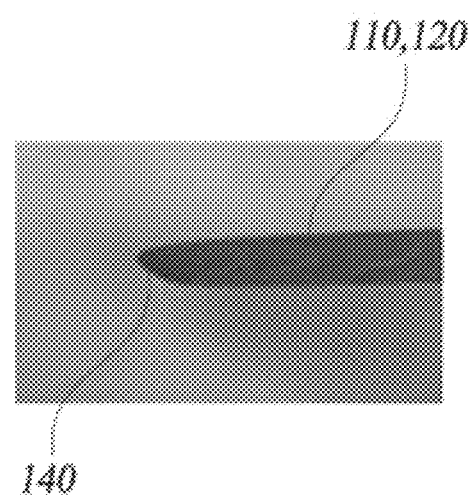
FIGS. 3B and 3C are views illustrating the shape of an end part of a window in contact with a folding part in a flexible cover window according to the present invention.
Figure 3C:
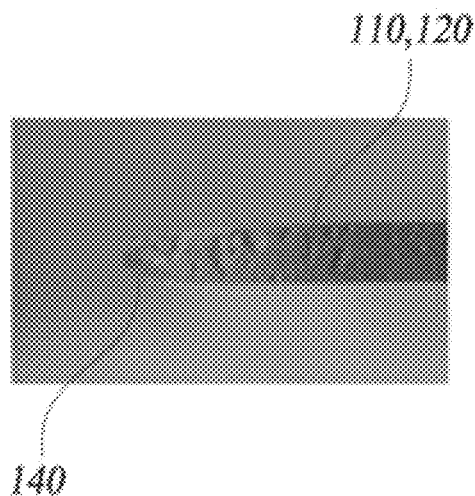
Figure 9A:
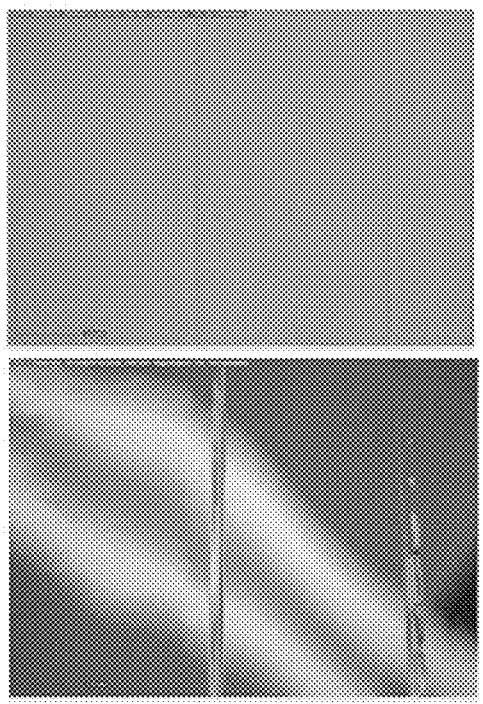
FIG. 9A is a view illustrating the visibility of the boundary part of the existing flexible cover window.
Figure 9B:
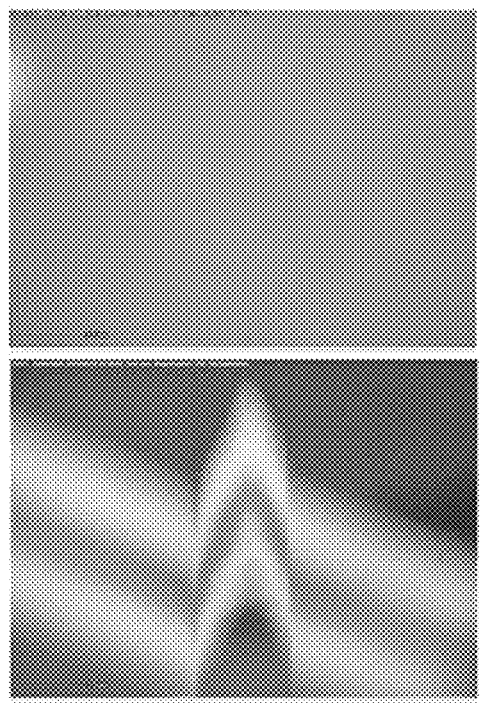
FIG. 9B is a view illustrating the visibility of a boundary part of the flexible cover window according to an embodiment of the present invention.
Figure 10A:
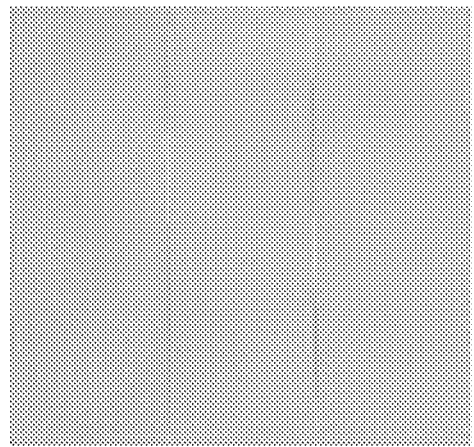
FIG. 10A is a view illustrating the visibility of the boundary part of the existing flexible cover window after combining the existing flexible cover window with a display panel.
Figure 10B:
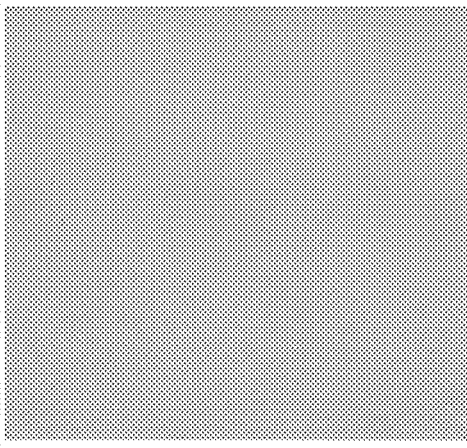
FIG. 10B is a view illustrating the visibility of the boundary part of the flexible cover window of the present invention after combining the flexible cover window of the present invention with a display panel.

Hereinbelow, embodiments of the present invention will be described with reference to the accompanying drawings. FIG. 3A is a view illustrating the shape of an end part of a window in contact with a folding part in the existing flexible cover window, and FIGS. 3B and 3C are views illustrating the shape of an end part of a window in contact with the folding part in a flexible cover window according to the present invention; FIGS. 4A, 4B, 5A, 5B, 6, 7, and 8 illustrate side views of the flexible cover window according to the various embodiments of the present invention; FIG. 9A is a view illustrating the visibility of a boundary part of the existing flexible cover window; FIG. 9B is a view illustrating the visibility of a boundary part of the flexible cover window according to an embodiment of the present invention; FIG. 10A is a view illustrating the visibility of the boundary part of the existing flexible cover window after combining the existing flexible cover window with a display panel; and FIG. 10B is a view illustrating the visibility of the boundary part of the flexible cover window of the present invention after combining the flexible cover window of the present invention with a display panel.

As illustrated in the drawings, the cover window 100 having improved visibility for a flexible display according to the present invention includes: a first window 110 made of glass and provided on an upper part of a first surface of the flexible display; a second window 120 made of glass and provided on an upper part of a second surface of the flexible display; and the folding part 130 provided between the first window 110 and the second window 120 by corresponding to the folding area of the display and filled with the transparent resin material, wherein a transparent resin layer 150 is provided on a total surface of each of the first window 110 and the second window 120 by continuing to the folding part 130 filled with the transparent resin material, and a chamfer part 140 is provided on each of the end part of the first window 110 and the end part of the second window 120, which are adjacent to the folding part 130, a curvature radius R of the chamfer part 140 being 0.01~0.1 mm.

The flexible display according to the present invention is folded in at least any one portion, and one surface of the display is referred to as a first surface, and the other surface is referred to as a second surface with the folding part as a boundary. As required, the folding part may be two or more parts, and in this case, the folding parts may be embodied as a third surface, a fourth surface, or the like, with the folding parts as boundaries. Accordingly, a third window, a fourth window, etc. may be formed correspondingly.

In addition, in the present invention, a back surface of each of the first window 110 and the second window 120 refers to a surface bonded to a display panel, and a front surface thereof refers to an upper surface of the flexible cover window 100 which a user can touch or recognize. That is, a portion folded relative to the folding part 130 is the front surface and a portion stretched relative thereto is the back surface.

Furthermore, "a total surface" refers to a surface of the entire area, and may include upper, lower, and side surfaces in some cases. In the present invention, "a total surface of a display panel" usually refers to a surface of an entire area of the front surface of the display panel.

Accordingly, the present invention provides the cover window 100 which is provided on the total surface of the display panel to maintain the folding properties and strength while protecting the display panel. Furthermore, the cover window 100 according to the present invention can be used to protect a clear polyimide (CPI) cover by being disposed on the CPI cover.

The present invention relates to the flexible cover window 100 bonded to such a flexible display, and the flexible cover window is made of a composite material that utilizes the advantages of glass and the resin material. Particularly, the folding area is made only of the resin material, so the thickness limitation of the cover window 100 for improving folding properties is not required, so that processing the cover window is easy and folding and strength properties can be improved.

In addition, the chamfer part 140 is formed on the end part of the first window 110 and the end part of the second window 120, which are adjacent to the folding part 130, and the curvature radius R of the chamfer part 140 is 0.01~0.1 mm. Accordingly, the visibility of the boundary part of the folding area, that is, the reflection of the boundary surface of each of the first window 110 and the second window 120, is minimized so as to deteriorate the visibility of the boundary part.

Figure 4A:
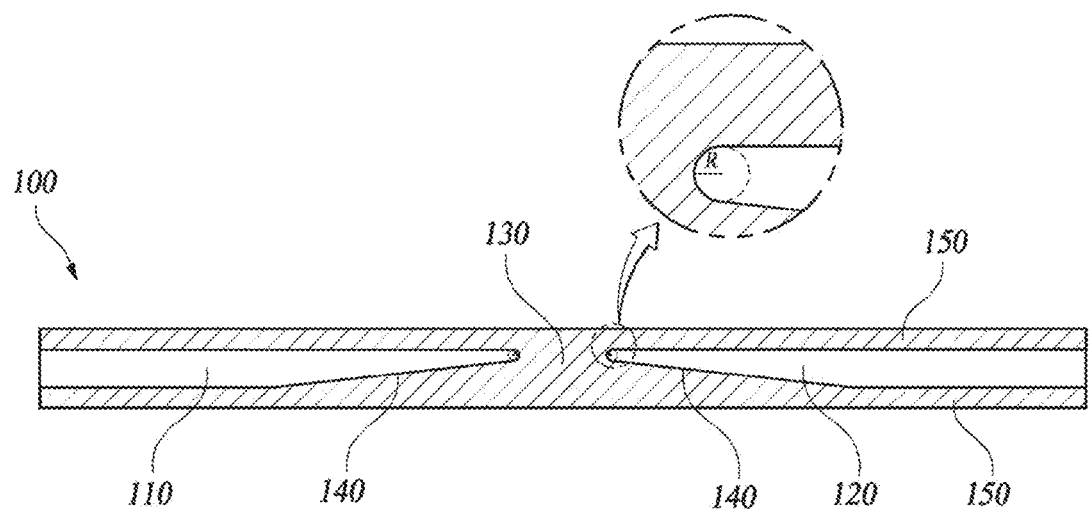
FIGS. 4A, 4B, 5A, 5B, 6, 7, and 8 illustrate side views of the flexible cover window according to various embodiment of the present invention.
Figure 4B:
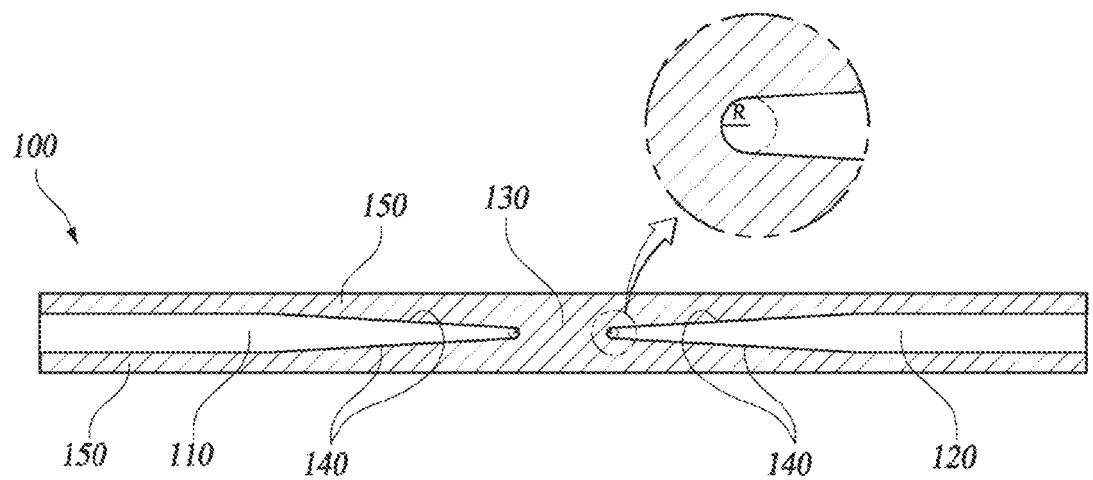

As illustrated in FIGS. 4A and 4B, the chamfer part 140 is formed no the end part of the first window 110 and the end part of the second window 120, and the chamfer part 140 is a part in which the edge of each of the first window 110 and the second window 120 is processed. The chamfer part 140 is configured to have a thickness gradually becoming thinner from the plane area toward the folding area, and particularly, the curvature radius of the chamfer part 140 is 0.01~0.1 mm.

When the curvature radius of the chamfer part 140 is larger than 0.01~0.1 mm, the boundary part is visible to the naked eye due to the reflection of the boundary surface and thus a display image quality is deteriorated. However, when the curvature radius of the chamfer part 140 is smaller than 0.01~0.1 mm, processing the windows may be difficult, and filling the resin material in an area neighboring the chamfer part 140 may not be performed properly.

The chamfer part 140 may be formed on a surface or opposite surfaces of each of the first window 110 and the second window 120 to be adjacent to the folding part 130, and may function to buffer difference of tensile stress caused by folding and to minimize the visibility of the boundary part of the folding part 130, that is, the visibility of the boundary part to the naked eye due to the reflection of the boundary surface of the side surface of glass.

Here, to minimize the reflection of the boundary surface of the side surface of glass, the inclination of the chamfer part 140 is preferably 1~10° relative to the horizontal direction of the cover window 100. This is to minimize the reflection of the boundary surface in contact with the folding part 130 while the texture of glass of the first window 110 and the second window 120 is maximally maintained so that the resolution difference or distortion of a screen is minimized.

The chamfer part 140 can be formed by any one process of wet etching, polishing, laser forming, and masking processes, or by a process of combining at least two processes thereof, or by the wet etching, the laser forming, or the masking process, which is followed by the polishing process.

That is, to minimize the visibility of the chamfer part 140 due to the reflection of the boundary surface thereof according to the present invention, the curvature radius of the chamfer part 140 is 0.01~0.1 mm, and the inclination thereof is 1~10°, so the visibility of the boundary surface is deteriorated.

FIG. 3A illustrates the shape of the end part of the window in contact with the folding part in the existing flexible cover window, and FIGS. 3B and 3C illustrate the shape of the end part of the window in contact with the folding part in the flexible cover window according to the embodiment of the present invention. In the existing flexible cover window of FIG. 3A, the thickness of the window is 0.2 mm, and the end part thereof has an unprocessed shape. In FIGS. 3B and 3C, the thickness of the window is 0.2 mm, and the end part thereof is processed to have a predetermined curvature radius.

The chamfer part 140 of FIG. 3B is formed on the surface of each of the first window 110 and the second window 120, and the curvature radius thereof is 0.025 mm. The chamfer part 140 of FIG. 3C is formed on the opposite surface of each of the first window 110 and the second window 120, and the curvature radius thereof is 0.08 mm.

Such a flexible cover window 100 according to the present invention includes: the first window 110 made of glass and provided on the upper part of the first surface of the flexible display; the second window 120 made of glass and provided on the upper part of the second surface of the flexible display; and the folding part 130 provided between the first window 110 and the second window 120 by corresponding to the folding area of the display and filled with the transparent resin material.

That is, the flexible cover window 100 according to the present invention is composed of two pieces, which are the first window 110 and the second window 120. The first window 110 and the second window 120 are spaced apart from each other by an interval corresponding to the folding area to form the folding part 130. The folding part 130 is filled with the transparent resin material, so that the thickness of the cover window 100 in the folding part 130 is not limited, and the folding properties are also improved.

In addition, the folding part 130 is filled with the transparent resin material, and the transparent resin layer 150 is formed on the total surface of each of the first window 110 and the second window 120 by continuing to the folding part 130 filled with the transparent resin material.

Accordingly, the flexible cover window 100 according to the present invention includes the first window 110, the second window 120, and the folding part 130 filled with the transparent resin material, and the transparent resin layer 150 is formed to cover the first window 110 and the second window 120 by continuing to folding part 130 filled with the transparent resin material.

Such a transparent resin layer 150 is formed on a surface of each of the first window 110 and the second window 120 or on a total surface of opposite surfaces thereof, or on the total surface of front, back, and side surfaces thereof to completely cover the first window 110 and the second window 120 inside the transparent resin layer 150.

That is, the first window 110 and the second window 120, which are made of glass, including the folding part 130 may be provided by being surrounded by the transparent resin layer 150, or as required, the transparent resin layer 150 may be formed only on a surface of the first window 110 and the second window 120.

Here, the material of the transparent resin layer 150 is the same as the transparent resin material. Filling the folding part 130 with the transparent resin material and coating the first window 110 and the second window 120 are performed at the same time, or as required, the folding part 130 may be first filled with the transparent resin material, and the transparent resin layer 150 may be formed by the coating with another material, for example, by the coating with a resin material harder or softer than the transparent resin material, with which the folding part 130 is filled.

Accordingly, according to the flexible cover window 100 made of the composite material, the first window 110 and the second window 120 are configured by being spaced apart from each other by the interval corresponding to the folding area, and the spaced part is filled with the transparent resin material to form the folding part 130, and the transparent resin layer 150 is formed on a surface or opposite surfaces of each of the first window 110 and the second window 120 by continuing to the folding part 130, so the first window 110 and the second window 120 made of glass may be arranged inside the transparent resin layer 150, and the folding part 130 filled with the transparent resin material is provided therebetween. Alternatively, the first window 110 and the second window 120 may be arranged on an upper part or a lower part of the transparent resin layer 150 and the folding part 130 filled with the transparent resin material may be arranged therebetween.

Furthermore, the transparent resin layer 150 is formed on the surface of each of the first window 110 and the second window 120 or on the total surface of the opposite surfaces thereof. Accordingly, when the cover window is bonded to the display panel, the cover window is in close contact with the display panel such that there is no empty space therebetween, thereby minimizing screen distortion caused by difference in refractive index due to the presence of an air layer, or a floating phenomenon of the cover window 100.

In addition, the transparent resin layer 150 is formed on the total surface of front, back, and side surfaces of each of the first window 110 and the second window 120 to completely cover the first window 110 and the second window 120 inside the transparent resin layer 150. Accordingly, the first window 110 and the second window 120 are included inside the transparent resin layer 150, and even the side surfaces of the first window 110 and the second window 120 can be protected by the transparent resin material.

Here, when the transparent resin layer 150 is formed to surround the opposite surfaces or the total surface of each of the first window 110 and the second window 120, a transparent resin layer 150 formed on the back surface of each of the first window 110 and the second window 120 is formed of a material softer than a material of a transparent resin layer 150 formed on the front surface of each of the first window 110 and the second window 120.

A portion which a user touches has the transparent resin layer 150 formed of a relatively hard material to maintain durability. The folded portion is formed of a hard material, and the stretching portion is formed of a relatively soft material to minimize cracks at the stretching portion.

An optical clear resin (OCR) having a refractive index almost identical to a refractive index (1.5) of glass is used as such a transparent resin material. For example, acrylic, epoxy, silicone, urethane, urethane compound, urethane acryl compound, hybrid sol gel, and siloxane family may be used. The combination of the resin materials is variously performed according to characteristics of the resin materials and can be used for reinforcing strength and elasticity.

Accordingly, in the flexible cover window 100 according to the present invention, the folding part 130 is not made of a glass material, but is made of the resin material, so the visibility of the boundary part of the folding part 130, that is, the visibility of the boundary part to the naked eye due to the reflection of the boundary surface of glass is minimized, and folding properties are improved. Furthermore, the flexible cover window according to the present invention is made of the composite material of glass and a resin material, so that flexibility, resilience, elasticity, and strength properties are reinforced due to the resin material while the optical properties and texture of glass are maximally maintained.

In addition, the folding part 130 of the flexible cover window according to the present invention is filled with the transparent resin material, and the transparent resin layer 150 is formed on the front surface of each of the first window 110 and the second window 120 by continuing to the folding part 130 so as not to form a gap between the cover window and the front surface of the display. Accordingly, the distortion of display quality can be minimized, the decrease of touch response speed and the decrease of bonding strength between the display and the cover window can be overcome, and the assembly tolerances between the cover window and the display panel can be minimized, thereby minimizing quality differences between products.

In addition, according to the present invention, to minimize the visibility of the boundary part to the naked eye due to the reflection of the boundary surface of glass, the transparent resin material or the transparent resin layer 150 may further have a low-reflection inorganic material added thereto. That is, the low-reflection inorganic material may be added only to the transparent resin material with which the folding part 130 is filled; may be added to both the transparent resin material and the transparent resin layer 150; or may be added only to the transparent resin layer 150. One of the three options may be appropriately selected and used according to a product process environment, the purpose of the use of a product, the use thereof, and product specifications. 10 to 80 parts by weight of the low-reflection inorganic material are preferably included in the resin material with respect to 100 parts by weight of the resin material constituting the transparent resin material and the transparent resin layer 150.

That is, the optical clear resin may be used by being mixed with 10 to 80 parts by weight of the inorganic material with respect to 100 parts by weight of the optical clear resin (OCR), which is the above-mentioned resin material, such as acrylic, epoxy, silicone, urethane, urethane compound, urethane acryl compound, hybrid sol gel, and siloxane family.

As such a low-reflection inorganic material, one of glass frit, glass fiber, titanium oxide nanoparticles, and silica nanoparticles, or a mixture thereof is used, and the particle size of the low-reflection inorganic material is preferably 5 nm to 100 nm to minimize the difference in a refractive index, and to minimize light reflection due to enhanced scattering of light.

Meanwhile, when the transparent resin layer is formed in multiple layers, such a low-reflection inorganic material may be mixed with the resin material such that the refractive indexes of the transparent resin layers are different from each other, and the degree of mixing the inorganic material with the resin material may be controlled according to the type and content of the low-reflection inorganic material, and the particle size thereof. For example, the transparent resin layer may be formed in multiple layers having a low refractive index and a relatively high refractive index.

Accordingly, in consideration of the characteristics of the transparency and the low reflection of the flexible cover window, the resin material is mixed with a predetermined amount of the low-reflection inorganic material to be used. The low-reflection inorganic material minimizes the visibility of the boundary part to the naked eye due to the reflection of the boundary surface of glass as described above. Furthermore, the low-reflection inorganic material is excellently matched with a window (glass) due to low thermal expansion coefficient, thereby minimizing micro-cracks and improving the bonding strength. In addition, the low-reflection inorganic material is excellent in surface hardness, scratch resistance, and a fingerprint resistance, thereby improving the reliability of display quality.

Meanwhile, a pattern such as a micro-lens array pattern and a moth eye pattern may be formed on the surface of the transparent resin layer 150 by an imprinting process so as to minimize the visibility of the boundary part to the naked eye due to the light reflection of the boundary surface of glass and to provide a high-resolution and high-definition display screen.

In addition, according to the present invention, the low reflection surface texturing is preferably performed on the surface of the chamfer part 140, or the surfaces of the first window 110 and the second window 120.

In the present invention, the low reflection surface texturing is intended to minimize the light reflection of the boundary surface, and may be performed only on the chamfer part 140, and may be selectively performed on the total surface (the front, back, and side surface) of each of the first window 110 and the second window 120 according to a product process environment, the purpose of the use of a product, the use thereof, and product specifications.

In addition, the low reflection surface texturing is intended to minimize the visibility of the boundary part to the naked eye due to the reflection of the boundary surface of glass according to the present invention. In the low reflection surface texturing, any process of texturing the chamfer part or window surface may be used. However, titanium oxide or silica is preferably deposited on the surface of the chamfer part 140, or the surfaces of the first window 110 and the second window 120 by a physical vapor deposition method, for example, by an e-beam deposition process to embody low reflection surface texturing. Alternatively, preferably, the surface of the chamfer part 140, or the surface of each of the first window 110 and the second window 120 is chemically etched to embody the low reflection surface texturing.

Like the addition of the low-reflection inorganic material in the embodiment described above, such low reflection surface texturing allows a pattern having a predetermined thickness and a predetermined size to be formed in consideration of the characteristics of the transparency and the low reflection. As described in detail above, the low-reflection inorganic material minimizes the visibility of the boundary part to the naked eye due to the reflection of the boundary surface of glass. Furthermore, the low-reflection inorganic material minimizes micro-cracks and improves the bonding strength. In addition, the low-reflection inorganic material is excellent in surface hardness, scratch resistance, and a fingerprint resistance, thereby improving the reliability of display quality. Additionally, the low reflection surface texturing of the chamfer part or the window surface improves an adhesive force between the transparent resin material and the transparent resin layer.

Accordingly, the cover window 100 according to the present invention may have the functional coating layer 160 formed additionally thereon to reinforce strength and elasticity, so the protection of the cover window 100 from external impacts or the pressure of a touch pen may further be reinforced.

Figure 5A:
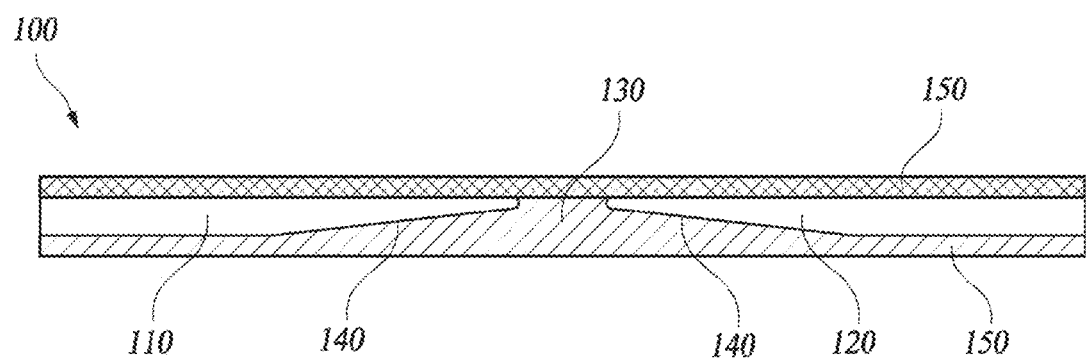
Figure 5B:
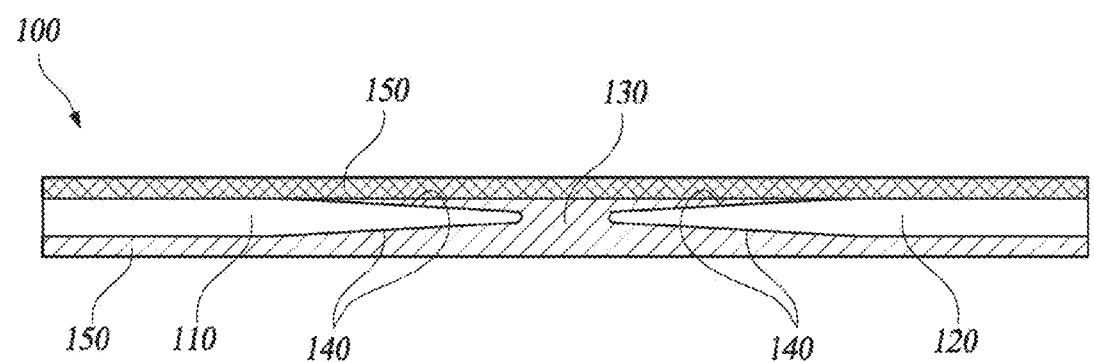
Figure 6:
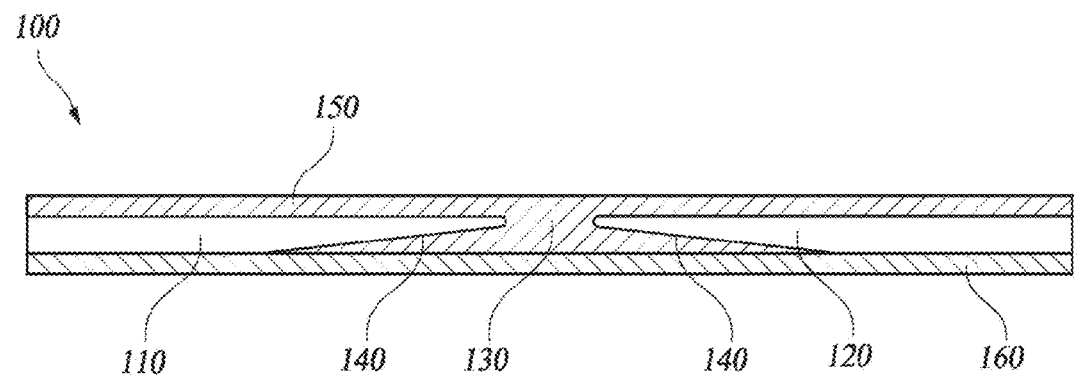

In addition, according to the flexible cover window 100 of the present invention, as illustrated in FIGS. 5A, 5B, and 6, the functional coating layer 160 may be provided on the surface or the opposite surfaces of the cover window 100. The functional coating layer 160 is formed of a transparent material such as the transparent resin material described above and has functionality by synthesizing a resin having a variety of properties.

When the folding part 130 is filled with the transparent resin material or when the transparent resin layer 150 is formed on the folding part 130 and the total surface of the cover window 100, the functional coating layer 160 may be formed on an upper layer thereof. This can be formed by a known resin coating method such as spraying, dipping, and spin coating.

The functional coating layer 160 may be formed in a single layer or multiple layers. The functional coating layer 160 formed on the front surface of the cover window 100 may be embodied as a strength reinforcement layer, and the functional coating layer 160 formed on the back surface of the cover window 100 may be embodied as an elastic reinforcement layer.

That is, since the front surface of the cover window 100 is touched, the functional coating layer 160 having a reinforced strength may be embodied in the front surface. The functional coating layer 160 having a reinforced elasticity may be embodied on the back surface of the cover window 100 to perform buffering between the back surface and the display panel.

The strength reinforcement layer (hard coating) of the front surface of the cover window 100 uses resin having relatively high hardness when the resin is hardened, for example, resin having a high content of resin such as acrylic or epoxy, and the elastic reinforcement layer (soft coating) of the back surface of the cover window 100 uses resin having relatively high elasticity when the resin is hardened, for example, resin having a high content of silicone or urethane synthetic resin. Furthermore, strength or elasticity is reinforced to be used by controlling the content of organic and inorganic materials in organic-inorganic hybrid sol-gel.

In addition, when the functional coating layer 160 provided on the front surface of the cover window 100 is configured as multiple layers, the functional coating layer 160 is preferably formed of a material getting harder upward.

Furthermore, the functional coating layer 160, particularly, a functional coating layer 160 formed on an uppermost layer may be given an anti-finger (AF) or an anti-reflective (AR) function, and may be embodied by synthesizing a resin having such a function or by forming various patterns, for example, patterns such as moth eyes on the functional coating layer 160.

Accordingly, the cover window 100 according to the present invention may have the functional coating layer 160 formed additionally thereon to reinforce strength and elasticity, so the protection of the cover window 100 from external impacts or the pressure of a touch pen may further be reinforced.

In addition, the functional coating layer 160 further prevents cracking in the folding area, and reinforces the elastic force of the cover window 100 on a surface in contact with the display panel, thereby functioning to improve impact resistance and prevent splintering.

Meanwhile, the cover window 100 of the present invention is used after receiving chemical tempering treatment and is formed to have the thickness of about 20 to 50 μm. The thickness of the entirety of the cover window 100 may be different according to product specifications, and is determined according to the thickness of the transparent resin layer 150. Generally, the transparent resin layer 150 may be configured to have the thickness of 1 to 150 μm.

The width of the folding part 130 is designed in consideration of a curvature radius of the cover window when the cover window 100 is folded, and is approximately 3.0 to 8.0 mm, which is produced by the curvature radius×π. The curvature radius is at least 0.5~2.5 mm during the folding. This is an optimal design for securing the thickness of the glass such that the intrinsic texture of the tempered glass is maintained and for securing the strength and the folding properties thereof at the same time.

FIG. 4A illustrates a case in which the transparent resin layer 150 of the embodiment of FIG. 3B is formed on the opposite surfaces of each of the first window 110 and the second window 120, that is, on the front surface and the back surface thereof according to the embodiment of the present invention. FIG. 4B illustrates a case in which the transparent resin layer 150 of the embodiment of FIG. 3C is formed on the opposite surfaces of each of the first window 110 and the second window 120, that is, on the front surface and the back surface thereof according to the embodiment of the present invention.

That is, FIG. 4A illustrates the case in which the chamfer part 140 is formed only on the back surface of each of the first window 110 and the second window 120, and FIG. 4B illustrates the case in which the chamfer part 140 is formed on the front surface and the back surface of each of the first window 110 and the second window 120. In this case, the curvature radius of the chamfer part 140 0.01~0.1 mm as described above. Accordingly, the reflection of the boundary surface is minimized to deteriorate the visibility of the boundary surface.

FIGS. 5A and 5B illustrate the transparent resin layer 150 formed on the total surface of the front surface of each of the first window 110 and the second window 120, the transparent resin layer 150 being formed of a material different from the transparent resin material, with which the folding part 130 is filled, for example, a resin material harder than the transparent resin material, with which the folding part is filled, in the embodiment of FIGS. 4A and 4B.

Figure 7:
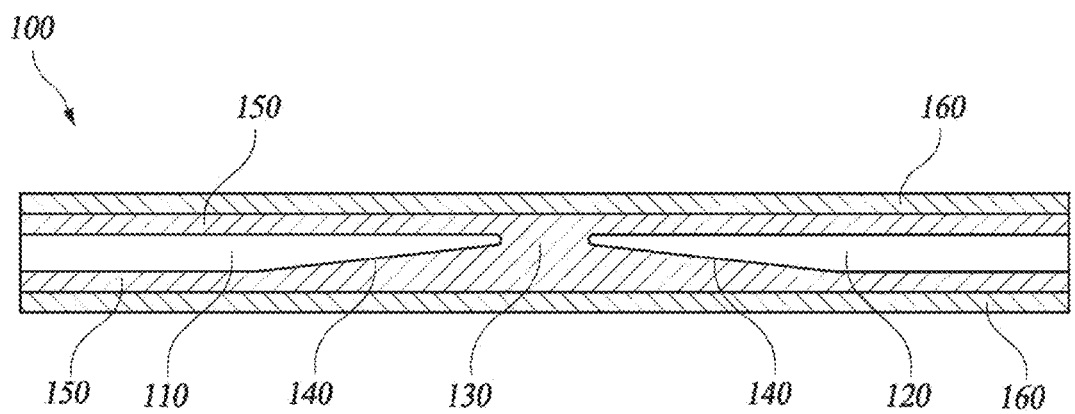

FIG. 6 illustrates a case in which the functional coating layer 160 is added to the back surface in FIG. 4A according to an embodiment of the present invention, and FIG. 7 illustrates a case in which the functional coating layer 160 is added to each of the front surface and the back surface in FIG. 4A according to an embodiment of the present invention.

Figure 8:
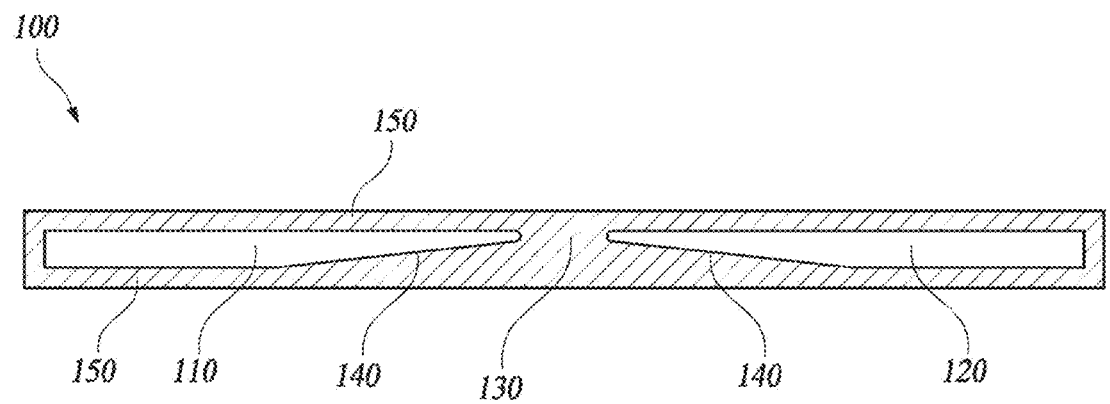

FIG. 8 illustrates a case in which the transparent resin layer 150 according to the present invention is formed on the total surface of the front, back, and side surfaces to completely cover the first window 110 and the second window 120 inside the transparent resin layer 150 according to an embodiment of the present invention.

In the embodiments, as required, the transparent resin material or the transparent resin layer is formed of the resin material mixed with the low-reflection inorganic material, or the low reflection surface texturing is performed on the chamfer part 140 or the total surface of the windows, thereby further minimizing the reflection of the boundary surface of glass, and improving strength as described above.

FIG. 9A is the view illustrating the visibility of the boundary part of the existing flexible cover window; FIG. 9B is the view illustrating the visibility of a boundary part of the flexible cover window according to the embodiment (when the curvature radius of the chamfer part is 0.025 mm) of the present invention; FIG. 10A is the view illustrating the visibility of the boundary part of the existing flexible cover window after combining the existing flexible cover window with a display panel; and FIG. 10B (when the curvature radius of the chamfer part is 0.025 mm) is the view illustrating the visibility of the boundary part of the flexible cover window of the present invention after combining the flexible cover window of the present invention with a display panel.

As illustrated in the drawings, in the existing flexible cover window, there are problems such as screen distortion and resolution degradation due to the light reflection of the boundary part between the window of the folding area and the folding part, that is, the boundary surface of glass. However, according to the embodiment of the present invention, such problems are completely solved, so a high-resolution and high-definition display screen can be provided.

Accordingly, the present invention relates to the flexible cover window, and more particularly, provides the flexible cover window, in which the visibility of the boundary part of the folding part, that is, the visibility of the boundary part to the naked eye due to the reflection of the boundary surface of glass is minimized, and strength and folding properties are secured.

In addition, the flexible cover window according to the present invention is made of the composite material of glass and the resin material, so that flexibility, resilience, elasticity, and strength properties are reinforced due to the resin material while the texture of glass is maximally maintained.

Additionally, the low reflection surface material is added to or the low reflection surface texturing is performed on the folding area or entire area of the flexible cover window, thereby minimizing the visibility of the boundary part to the naked eye due to the reflection of the boundary surface of glass, minimizing micro-cracks, and improving the bonding strength. In addition, the low-reflection inorganic material is excellent in surface hardness, scratch resistance, and a fingerprint resistance, thereby improving the reliability of display quality.

Furthermore, according to the flexible cover window of the present invention, the limitation of the thickness of the folding part due to the use of the existing glass is minimized due to the use of the composite material of glass and the resin material, so folding and strength properties are improved.

Accordingly, since there is no limitation of the thickness in the folding part, stress difference due to difference of the thickness of glass between the plane area and the folding area can be overcome, so the distortion of a screen or the deterioration of the resolution and durability thereof can be minimized and thus a high quality flexible display can be provided.

What is claimed is:
1. A flexible cover window for a flexible display, the flexible cover window comprising:
a first window made of glass and provided on an upper part of a first surface of the flexible display;
a second window made of glass and provided on an upper part of a second surface of the flexible display; and a folding part provided between the first window and the second window by corresponding to a folding area of the display and filled with a transparent resin material,
wherein a transparent resin layer is provided on a total surface of each of the first window and the second window by continuing to the folding part filled with the transparent resin material,
a chamfer part is provided on each of an end part of the first window and an end part of the second window, which are adjacent to the folding part, a curvature radius of the chamfer part being 0.01 mm to 0.1 mm,
wherein the chamfer part of the first window and the second window are configured to have a thickness gradually becoming thinner from a plane area of the flexible cover window toward a folding area of the flexible cover window so that the inclination of the chamfer part is 1 to 10° relative to a horizontal direction of the cover window, and
a low reflection surface texturing is performed on a surface of the chamfer part, or on the surface of each of the first window and the second window, wherein in the low reflection surface texturing, titanium oxide or silica is deposited directly on the surface of the chamfer part or directly on the surface of each of the first window and the second window.

2. The flexible cover window of claim 1, wherein a low-reflection inorganic material is added to the transparent resin material or the transparent resin layer.

3. The flexible cover window of claim 2, wherein 10 to 80 parts by weight of the low-reflection inorganic material are included in a resin material with respect to 100 parts by weight of the resin material constituting the transparent resin material and the transparent resin layer.

4. The flexible cover window of claim 3, wherein the resin material is an optical clear resin (OCR).

5. The flexible cover window of claim 2, wherein the low-reflection inorganic material is one of glass frit, glass fiber, titanium oxide nanoparticles, and silica nanoparticles, or a mixture thereof.

6. The flexible cover window of claim 5, wherein a particle size of the low-reflection inorganic material is 5 nm to 100 nm.

7. The flexible cover window of claim 1, wherein a micro-lens array pattern is formed on a surface of the transparent resin layer.

8. The flexible cover window of claim 1, wherein the chamfer part is provided on a surface or opposite surfaces of each of the first window and the second window.

9. The flexible cover window of claim 1, wherein the transparent resin layer is provided on a surface of each of the first window and the second window, or on a total surface of opposite surfaces thereof, or on a total surface of front, back, and side surfaces thereof to completely cover the first window and the second window inside the transparent resin layer.

10. The flexible cover window of claim 9, wherein in the transparent resin layer, the transparent resin layer provided on the back surface of each of the first window and the second window is made of a material softer than a material of the transparent resin layer provided on the front surface of each of the first window and the second window.

11. The flexible cover window of claim 1, wherein the chamfer part is provided by any one process of wet etching, polishing, laser forming, and masking processes, or by a process of combining at least two processes thereof, or by the wet etching, the laser forming, or the masking process, which is followed by the polishing process.

12. The flexible cover window of claim 1, further comprising:
a functional coating layer provided on a surface or opposite surfaces of the cover window.

13. The flexible cover window of claim 12, wherein the functional coating layer is configured as a single layer or multiple layers.

14. The flexible cover window of claim 13, wherein the functional coating layer provided on a front surface of the cover window is embodied as a strength reinforcement layer, and the functional coating layer provided on a back surface of the cover window is embodied as an elastic reinforcement layer.

15. The flexible cover window of claim 13, wherein when the functional coating layer provided on the front surface of the cover window is configured as multiple layers, the functional coating layer is made of a material becoming harder upward.

16. The flexible cover window of claim 13, wherein the functional coating layer provided on an uppermost layer is given an anti-finger (AF) or an anti-reflective (AR) function.

17. The flexible cover window of claim 1, wherein a thickness of each of the first window and the second window is 10 to 200 μm.

18. The flexible cover window of claim 1, wherein the cover window satisfies a minimum curvature radius of at least 0.5 mm during folding.

* * * * *